(12) United States Patent
Adams et al.

(10) Patent No.: US 7,467,212 B2
(45) Date of Patent: Dec. 16, 2008

(54) CONTROL OF ACCESS CONTROL LISTS BASED ON SOCIAL NETWORKS

(75) Inventors: Robert Adams, Lake Oswego, OR (US); Jose P. Puthenkulam, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 572 days.

(21) Appl. No.: 09/750,533

(22) Filed: Dec. 28, 2000

(65) Prior Publication Data

US 2002/0124053 A1   Sep. 5, 2002

(51) Int. Cl.
*G06F 15/16* (2006.01)
*G06F 15/173* (2006.01)

(52) U.S. Cl. .................. 709/229; 709/206; 709/224; 726/4; 726/21

(58) Field of Classification Search ......... 709/224–226, 709/229, 204, 206; 726/2, 4, 21
See application file for complete search history.

(56) References Cited

U.S. PATENT DOCUMENTS

| | | | | |
|---|---|---|---|---|
| 5,787,177 A * | 7/1998 | Leppek | ...................... | 713/164 |
| 5,974,149 A * | 10/1999 | Leppek | ...................... | 713/164 |
| 6,044,466 A * | 3/2000 | Anand et al. | ................. | 713/200 |
| 6,141,686 A * | 10/2000 | Jackowski et al. | ........... | 709/224 |
| 6,151,585 A * | 11/2000 | Altschuler et al. | ............. | 705/10 |
| 6,189,032 B1 * | 2/2001 | Susaki et al. | ................. | 709/225 |
| 6,189,104 B1 * | 2/2001 | Leppek | ........................... | 726/1 |
| 6,397,336 B2 * | 5/2002 | Leppek | ........................... | 726/4 |
| 6,453,327 B1 * | 9/2002 | Nielsen | ....................... | 715/500 |
| 6,484,197 B1 * | 11/2002 | Donohue | .................... | 709/206 |
| 6,530,024 B1 * | 3/2003 | Proctor | ......................... | 726/23 |
| 6,535,916 B1 * | 3/2003 | Nguyen | ...................... | 709/224 |
| 6,546,416 B1 * | 4/2003 | Kirsch | ........................ | 709/206 |
| 6,654,787 B1 * | 11/2003 | Aronson et al. | ............. | 709/206 |
| 6,658,455 B1 * | 12/2003 | Weinman, Jr. | .............. | 709/203 |
| 6,681,247 B1 * | 1/2004 | Payton | ........................ | 709/217 |
| 6,708,215 B1 * | 3/2004 | Hingorani et al. | ........... | 709/229 |
| 6,711,570 B1 * | 3/2004 | Goldberg et al. | ............... | 707/6 |
| 6,732,157 B1 * | 5/2004 | Gordon et al. | .............. | 709/206 |
| 6,748,422 B2 * | 6/2004 | Morin et al. | ................. | 709/206 |
| 6,779,021 B1 * | 8/2004 | Bates et al. | .................. | 709/206 |
| 6,829,643 B1 * | 12/2004 | Tobe et al. | ................... | 709/226 |
| 6,898,619 B1 * | 5/2005 | Tran | ............................. | 709/203 |

(Continued)

OTHER PUBLICATIONS

Lewis, L., "Implementing policy in enterprise networks", Communications Magazine, IEEE, vol. 34, Issue 1, Jan. 1996, pp. 50-55.*

(Continued)

*Primary Examiner*—Douglas B Blair
(74) *Attorney, Agent, or Firm*—Blakely, Sokoloff, Taylor & Zafman, LLP

(57) ABSTRACT

A method of controlling a social network access control list (ACL) for a shared resource includes monitoring communications to and from a user. Social network data from the communications to and from the user is determined. An access level for the user is determined based on the social network data. The access control list is configured to provide the user the access level determined for accessing the shared resource.

27 Claims, 3 Drawing Sheets

U.S. PATENT DOCUMENTS

| | | | |
|---|---|---|---|
| 6,925,567 B1 * | 8/2005 | Hirata | 713/189 |
| 6,965,919 B1 * | 11/2005 | Woods et al. | 709/206 |
| 7,072,943 B2 * | 7/2006 | Landesmann | 709/206 |
| 7,185,192 B1 * | 2/2007 | Kahn | 713/155 |
| 7,379,972 B2 * | 5/2008 | Landesmann et al. | 709/206 |
| 2002/0083151 A1 * | 6/2002 | Adams et al. | 709/217 |
| 2003/0050977 A1 * | 3/2003 | Puthenkulam et al. | 709/204 |
| 2003/0074409 A1 * | 4/2003 | Bentley | 709/206 |
| 2005/0055306 A1 * | 3/2005 | Miller et al. | 705/37 |

OTHER PUBLICATIONS

Drucker et al.,"Support Vector Machines for Spam Categorization", Sep. 1999, IEEE Transactions on Nueral Networks, vol. 10, Iss. 5, pp. 1048-1054.*

Androutsopoulos et al., "An Experimental Comparison of Naive Bayesian and Keyword-Based Anti-Spam Filtering With Personal E-mail Messages." In: Proceedings of the 23rd Annual International ACM SIGIR Conference on Research and Development in Information.*

* cited by examiner

CONTROL OF ACCESS CONTROL LISTS BASED ON SOCIAL NETWORKS

BACKGROUND OF THE INVENTION

1. Field of the Invention

The present invention generally relates to management of access control lists (ACLs) used to regulate access to shared resources. More particularly, the present invention relates to automated control of ACLs based on analysis of social networks to regulate access.

2. Discussion of the Related Art

In large institutions such as corporations, research centers, and educational facilities, networked computer systems are commonplace. By utilizing a network architecture, various resources within the institution may be shared by its users. For example, all the users having workstations located at the northwest end of a floor in a building could be configured to share a common printer. Or, all the users on a design team may be granted access to open/read a spreadsheet file, containing all the names and telephone numbers of the team members, stored on the workstation of a particular user or system.

Typically, access to files and other resources are managed with access control lists (ACLs), which contain information such as an identity (e.g., user name, identification number, etc.) of the user or entity, and an access right or level (e.g., no access, read-only access, read/write access, etc.), for all the users/entities that have access to a particular resource. These ACLs are usually manually configured by a user or a system administrator, and stored on an authentication server. That is, the identity and access right pairs are manually entered to create the ACLs for each shared resource in a network. However, the ACLs may be stored as part of the resource itself, or separately. In a file system, for example, the ACLs are typically stored as part of the file resource itself. In a case where the resource is a printer, for example, the ACLs are stored usually on a server running the Print Scheduler.

Manual entry of ACLs is a long and cumbersome process, which increases the maintenance costs of the entire system, particularly when new groups are formed or disbanded over short periods of time. Additionally, when a new user transitions into a group, or transitions from one group to another, a number of ACLs may be affected. Time is required for a user or a system administrator to update each affected ACL so that the new user has the appropriate access to the shared resources utilized by the group (or even to restrict access to shared resources of a former group). Access control lists can also become very large and unwieldy, which makes it difficult to remember which users are on the ACLs, or to whom the access levels have been assigned. Therefore, automated, fast, accurate, and cost-effective management of ACLs for shared resources in a network infrastructure is desirable.

DETAILED DESCRIPTION

Figure 1:
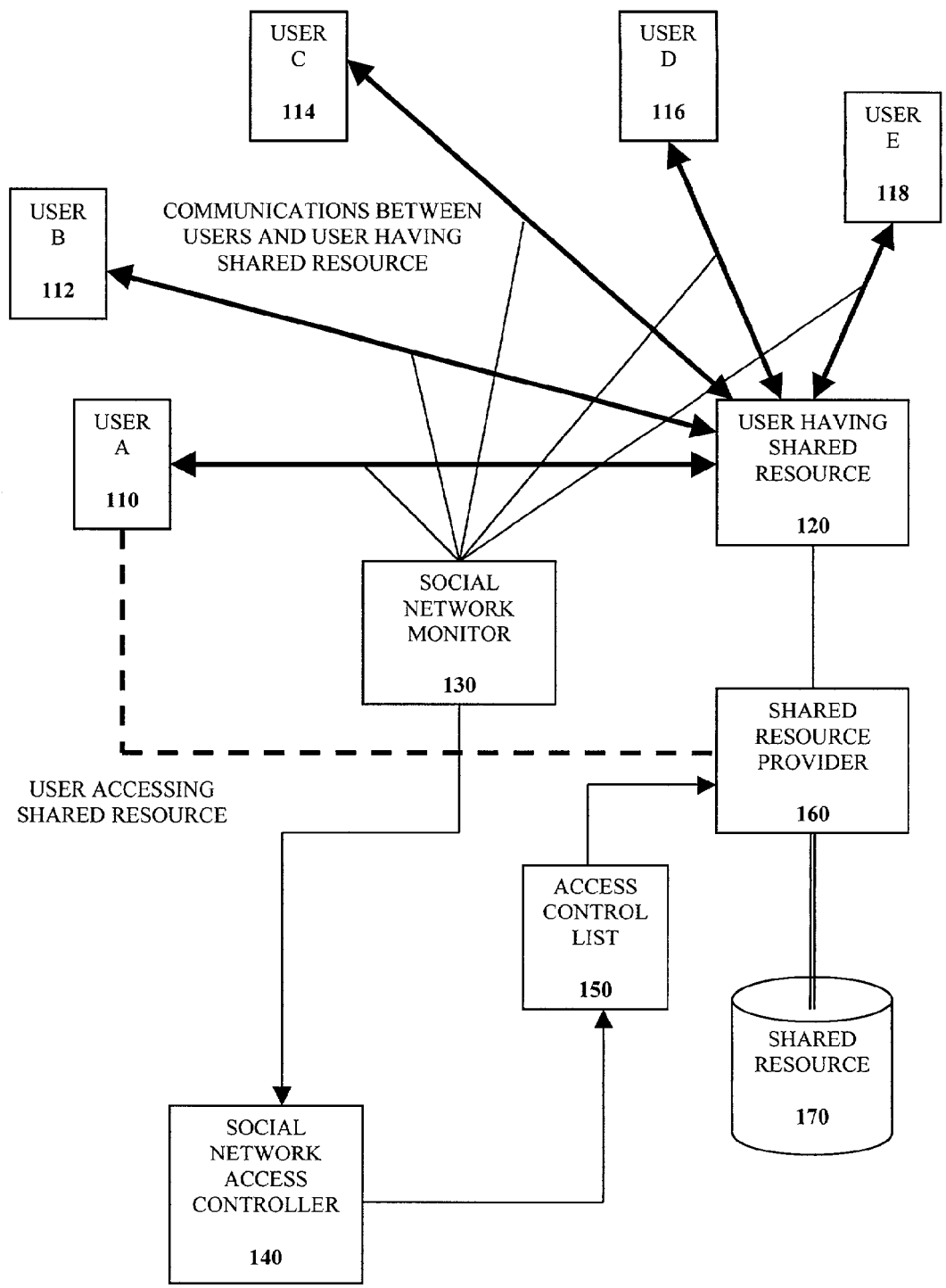
FIG. 1 illustrates a social network utilizing an access control list (ACL) to control access for a shared resource according to an embodiment of the present invention.

FIG. 1 illustrates a social network utilizing an access control list (ACL) to control access for a shared resource according to an embodiment of the present invention. A plurality of users or entities (A-E) 110, 112, 114, 116, 118 are shown having communications with a user or entity 120 having the shared resource 170. For example, the plurality of users 110, 112, 114, 116, 118, 120 may all be co-workers in the same company, or only the co-workers working together on a particular project. The shared resource 170 may include a file, a directory, an input/output device, a piece of hardware (e.g., a printer, copier, storage device), and a computer system (such as portable electronic devices like personal digital assistants (PDAs), cellular telephones, and Internet appliances, etc.). Other shared resources 170 may include other electronic systems, such as electronic banner systems, digital cameras, remote-controlled devices, etc. This web of personal relationships among the users 110, 112, 114, 116, 118, 120 is referred to as a social network. Each user 110, 112, 114, 116, 118 having communications with the user 120 having the shared resource 170 may each have various degrees of interaction with the user 120 (as well as with each other). For example, some users may communicate more often to a particular user than others. In the example illustrated in FIG. 1, only a single user 120 having a single shared resource 170 is shown. However, the social network may be more complex, wherein the users 110, 112, 114, 116, 118 also have communications amongst each other, and each one of the users has shared resources that may be shared with the entire group. In the example illustrated in FIG. 1, users A-E 110, 112, 114, 116, 118 make up the social network around the user 120 having the shared resource 170.

A social network monitor 130 is provided to monitor the communications between the plurality of users 110, 112, 114, 116, 118 and the user 120 having the shared resource 170. Many forms of communication may be exchanged between the users (A-E) 110, 112, 114, 116, 118 and the user 120 having the shared resource 170. E-mail communications are one of the most popular forms of electronic communication. For example, the social network monitor 130 may be a software application residing on a computer system of the user 120 having the shared resource 170 (or at any other suitable location, or with any other suitable user or system) that monitors all e-mail traffic entering and leaving the computer system of the user 120 having the shared resource 170. The software application may be stored on any suitable computer-readable medium, such as a semiconductor memory, a hard disk drive, an optical disk, or a magnetic tape, etc. However, any form of communication between the users 110, 112, 114, 116, 118, 120 may be monitored, such as file transfers, instant messages, commands sent from one computer system to another, etc.

By monitoring the communications between the users 110, 112, 114, 116, 118, 120 in the social network, the social network monitor 130 may determine social network data therefrom. Social network data may include any information utilized to construct the social network model and assign access levels amongst the users 110, 112, 114, 116, 118 to access the shared resource 170. For example, the social network data extracted from the communications between the users 110, 112, 114, 116, 118, 120 may include: (1) identities (names, identification numbers, etc.) of the users 110, 112, 114, 116, 118, 120; (2) the frequency of interaction over a time period between the users 110, 112, 114, 116, 118, 120; (3) a chronology of the communications (e.g., date and time of each communication, how recent was the last communication); (4) a topic of the communications; (5) a ratio of received/transmitted communications between particular users; and (6) any resources (e.g., attached files) included in the communications. For example, the social network data may indicate that user B 112 exchanged 17e-mails with the user 120 having the shared resource 170 over a 24-hour period, while user C exchanged only 3 e-mails with the user 120 having the shared resource 170 over the same period. However, social network data may be inferred from sources other than e-mail communications, such as organizational groupings, locality (based on where people are physically located), family information, Web page access monitoring, telephone conversation monitoring, chat room monitoring, etc.

A social network access controller 140 is provided to determine, based on the social network data, an access level for the user to access the shared resource 170. The social network access controller 140 may be in the form of a software application executing on a computer system, for example, of the user 120 having the shared resource 170. Likewise the social network monitor 130 may also be on the computer system of the user 120 having the shared resource 170. However, the social network monitor 130 and the social network access controller 140 may reside on separate systems as well.

Different access levels may be assigned to each one of the users 110, 112, 114, 116, 118 based on the social network data determined for each user 110, 112, 114, 116, 118. For example, the access levels for a computer file resource 170 (such as a Microsoft Word document, or a hypertext markup language (HTML) file) may include: (1) no access—the user is barred from accessing the resource 170; (2) read-only access—the user can only read the file; (4) read/write access—the user can read and write to the file; (5) execute access—the user can execute (run) the file, or files in a directory; (6) create access—the user can create a new file in a directory; (7) owner access—the user can modify the file, directory, etc.; (8) all access—the user has access to all read, write, execute, and create functions to the resource (file) 170; and (9) control access—the user has access to control a remote-controlled device resource 170, including, for example, remotely closing and opening physical doors. However, there may be other access level types as well, such as the ability to change a paper type in a paper tray (e.g., from draft paper to bonded paper) in a shared printer resource 170. For a chat room or bulletin board service application, various access types may include permissions to add, invite, or ban users; permissions to view and/or write posted messages (bulletins); or permissions to run scripts or programs within the chat rooms.

By utilizing the social network data based on a set of defined rules, various access levels may be automatically configured for each user 110, 112, 114, 116, 118. For example, the access levels may follow a rule-set based on the type and/or frequency of interaction (communications) between the users 110, 112, 114, 116, 118, 120 as follows:

TABLE 1

| Social Interaction Type (Frequency) Determined from Social Network Data | Access Level |
| --- | --- |
| Frequent e-mail communication, >10 per week | all access |
| E-mail communication at >3 per week | read/write access and execute access |
| E-mail communication at least once in two weeks | read-only access and execute access |
| E-mail communication at least once a month | read-only access |
| All other cases | no access |

However, the frequency of communication is but one possible criteria that may be extracted from the social network data to determine access levels. For example, access levels may be granted based on the topics mentioned in the communications between the users 110, 112, 114, 116, 118, 120. That is, the communications may be monitored so as to search for particular keyword(s). Then, access levels may be granted based on the number of occurrences of these particular keyword(s). The various access levels may be granted depending on the number of occurrences (i.e., the more times a specific keyword(s) is found in a communication, the higher level of access is granted). Different weights may be assigned to different keywords, so that certain keywords may have higher weights than others (thus leading to higher access levels). For example, a "point" system may be utilized to keep track of the number of points accumulated based on the occurrence of keywords detected in communications within a period of time. Access levels may also be determined by the user's identity (e.g., certain users are preset to have minimum access levels), the chronology of the communications (e.g., users having more recent communications are granted higher access levels than users having less recent communications), or the resources (such as a particular file, type of file, a Web page, a document, etc.) transmitted to and/or received from the user. Access levels may also be determined by a user's interest in the shared resource 170, such that the greater the interest in the shared resource 170 (e.g., the greater the frequency of accessing the shared resource), the higher access level may be provided over time.

The social network access controller 140 also configures an access control list (ACL) 150, which is used to provide a user with the determined access level for accessing the shared resource 170. The social network access controller 140 is preferably adapted to add or remove identity entries as well, as new users or entities transition into and out of a group. That is, the social network monitor 130 notifies the social network access controller 140 when the user 120 having the shared resource 170 receives or transmits communications to a new user or entity, and a new identity entry may be ultimately added to the ACL 150. As mentioned above, the ACL 150 preferably includes an identity and access right pair. That is, a user name and an access level may be associated in the ACL 150, for example:

(1) John Doe, read-only access;
(2) Jane Wright, read/write access; and
(3) Jose Paul, all access.

By looking-up the access control list 150, a shared resource provider 160 is adapted to provide to the user 110 who is attempting to access the shared resource 170 the appropriate access level, and restrict access, if required. The ACL 150 may contain only the identity/access level pair information, or it may contain other information as well, such as a password to provide more precise access control based on the password(s) provided by the user.

The shared resource provider 160 may be a software application resident on the computer system of the user 120 having the shared resource 170, or on a separate system, such as on the system storing the shared resource 170 if the shared resource 170 is stored separately from the computer system of the user 120 "having" the shared resource 170. This is particularly the case if the shared resource 170 (which may be a plurality of files, for example) is distributed across a network. The shared resource provider 160 acts as a gateway to check the ACL 150 and provide the appropriate level of access to the user(s) attempting to access the shared resource 170. The shared resource provider 160 is preferably implemented as part of, for example, the file system that controls the opening, reading, and writing accesses of the shared resource 170. Therefore, if the shared resource 170 is a computer file and if the ACL 150 shows that user A 110 has a "read-only" access level, then, the shared resource provider 160 will only enable user A 110 to read the shared resource file 170 and nothing else.

Figure 2:
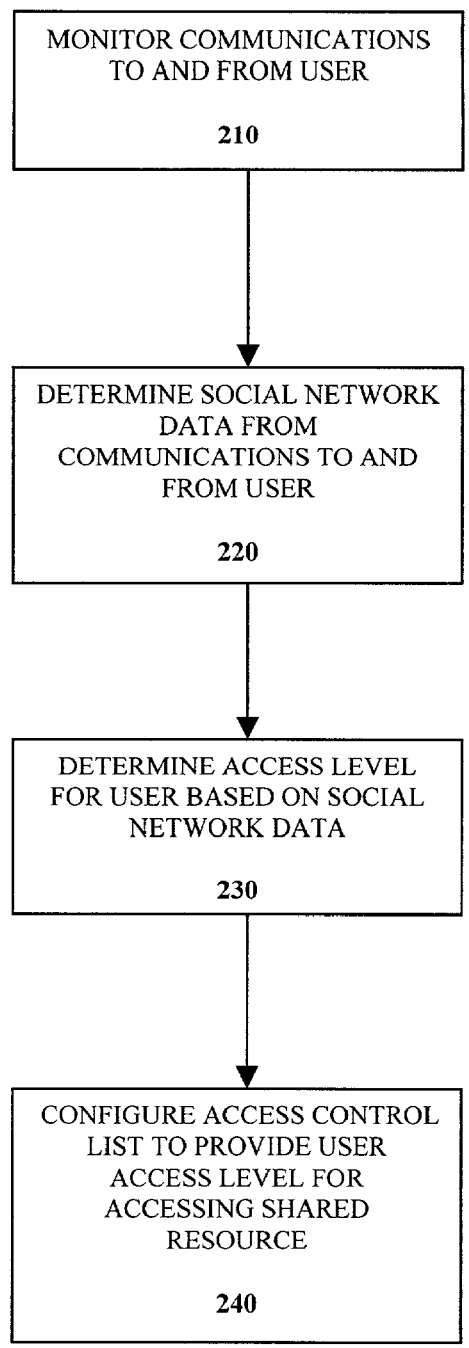
FIG. 2 illustrates a flow chart diagram showing an operation of a social network utilizing an access control list (ACL) to control access for a shared resource according to an embodiment of the present invention.
Figure 3A:
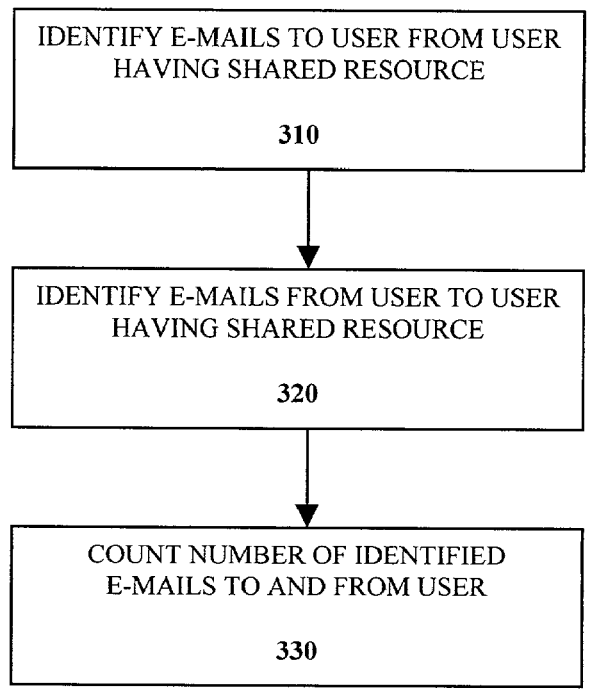
FIG. 3A illustrates a flow chart diagram showing the determining of social network data from communications to and from a user according to an embodiment of the present invention.

FIG. 2 illustrates a flow chart diagram showing an operation of a social network utilizing an access control list (ACL) to control access for a shared resource according to an embodiment of the present invention. First, communications between a user(s) 110, 112, 114, 116, 118 and a user or entity 120 having a shared resource 170 are monitored 210. Based on the communications between user(s) 110, 112, 114, 116, 118 and a user 120 having a shared resource 170, social network data is determined 220. As shown in FIG. 3A, for example, e-mail communications to a user 110, 112, 114, 116, 118 from the user 120 having the shared resource 170 are identified 310. E-mail communications from a user 110, 112, 114, 116, 118 to the user 120 having the shared resource 170 are also identified 320. The e-mail communications to and from the user 120 having the shared resource 170 with a particular user 110, 112, 114, 116, 118 are counted 330.

Figure 3B:
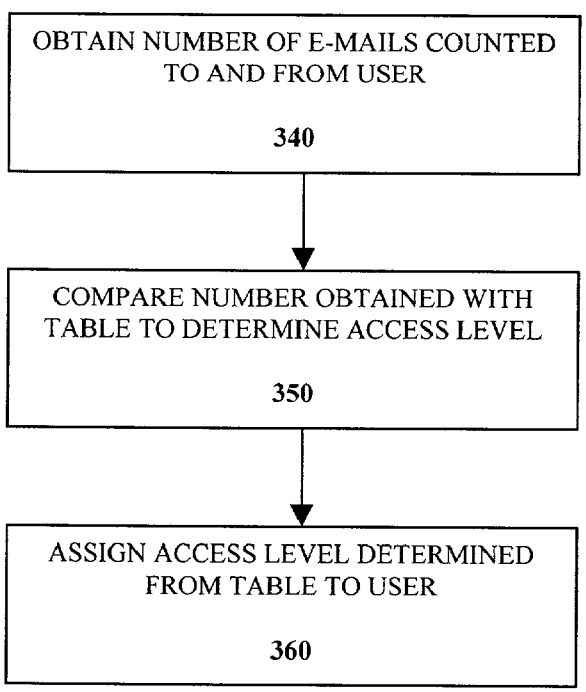
FIG. 3B illustrates a flow chart diagram showing the determining of an access level for a user based on social network data according to an embodiment of the present invention.

From the social network data (e.g., the number of e-mail communications to and from a particular user 110, 112, 114, 116, 118 with the user 120 having the shared resource 170), an access level is determined 230 for each user 110, 112, 114, 116, 118 regarding access to the shared resource 170. As shown in FIG. 3B, for example, the number of e-mail communications counted to and from the user 120 having the shared resource 170 with a particular user 110, 112, 114, 116, 118 is obtained 340. Then, as mentioned above for example, the number obtained may be compared to a look-up table (see Table 1 above) to determine 350 the access level for a particular user 110, 112, 114, 116, 118. An appropriate access level may be assigned 360 to the user 110, 112, 114, 116, 118 based on the look-up table. Once the access level is determined 230, an access control list (ACL) 150 for the shared resource 170 is configured 240 so as to provide the appropriate access level for each user capable of accessing the shared resource 170.

Therefore, the management of ACLs according to an embodiment of the present invention is automated and cost-effective, allowing a resource 170 to be shared with a dynamic "social" group. That is, the resource 170 may be shared with a group (social network) that is constantly changing. Additionally, the ACLs may be managed and updated continuously (and "on-the-fly" each time the users 110, 112, 114, 116, 118, 120 communicate amongst each other or attempt to access the shared resource 170), so as to add or remove entries (of users) or change access levels in the ACL 150 as users transition in and out of a group, or as the communications between the users change (in frequency, topic matter, etc.).

While the description above refers to particular embodiments of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes that come within the meaning and range of equivalency of the claims are therefore intended to be embraced therein.

What is claimed is:

1. A method of sharing resources on a social network, the method comprising:

monitoring communications between a plurality of users and a user having a shared resource coupled to a computer system of the user, the shared resource to be shared amongst one or more of the plurality of users;

determining social network data from the communications between each of the plurality of users and the user having the shared resource, wherein each of the plurality of users has an ongoing relationship with the user having the shared resource and the social network data is based on varying degrees of interactions between each of the plurality of users and the user having the shared resource, wherein the communication includes communicating via emails between each of the plurality of users having the shared resources, wherein the emails are identified and counted;

determining an access level for each of the plurality of users based on the social network data including the identified and counted emails, wherein the access level is selected from a group consisting of a read-only access, a read/write access, an execute access, a create access, an owner access, a no access, an all access, and a control access; and configuring an access control list to provide each of the plurality of users the access level determined for accessing the shared resource.

2. The method according to claim 1, wherein the social network data includes one or more of identities of the plurality of users and the user having the shared resource, a frequency of interaction between all users for a time period, a chronology of the communications, a topic of the communications, and resources attached to the communications.

3. The method according to claim 1, wherein the access control list includes a user identification and the access level for the user.

4. The method according to claim 1, wherein the shared resource comprises one or more of a file, a directory, a user, an input/output device, a peripheral device, portable electronic devices, and a computer system.

5. The method according to claim 1, wherein the social network data includes monitoring communications for particular keyword(s), wherein the access level is granted based on the number of occurrences of the particular keyword(s).

6. The method according to claim 5, wherein different weights are assigned to different keywords, wherein certain keywords have higher weights than other keywords.

7. The method according to claim 1, further comprising continuously updating the access control list to add and remove entries or to change access levels as the users transition in and out of the social network or as communications between the users changes.

8. The method according to claim 1, wherein the communications comprise one or more of emails, instant messages, file transfers, commands sent from one computer system to another, and any other types of communications performed between the plurality of users and the user having the shared resource.

9. The method according to claim 1, wherein determining social network data comprises:
   identifying communications from the user having the shared resource to each of the plurality of users;
   identifying communications from each of the plurality of users to the user having the shared resource; and
   tallying each identified communication for each of the plurality of users.

10. The method according to claim 1, wherein determining an access level comprises:
    obtaining a total number of communications with the user having the shared resource for each of the plurality of users based on the social network data;
    comparing the total number of communications for each of the plurality of users to an access level table to obtain the access level, the access level table comprising a plurality of access levels based on the total number of communications; and
    assigning an access level to each of the plurality of users.

11. A communications system comprising:
    a computer system having a processor coupled with a storage medium, the computer system to control user access to a shared resource via an access controller, the shared resource including a data processing device, and the access controller including a first module being executed on the computer system, the computer system further having a network monitor coupled with the access controller, the network monitor including a second module being executed on the computer system, the network monitor to
       monitor communications between a plurality of users and a user having the shared resource coupled to a computing device of the user, and
       determine social network data from the communications between each of the plurality of users and the user having the shared resource, wherein each of the plurality of users has a relationship with the user having the shared resource and the social network data is based on varying degrees of interactions between each of the plurality of users and the user having the shared resource, wherein the communication includes communicating via emails between each of the plurality of users having the shared resources, wherein the emails are identified and counted; and
    the network access controller to
       determine an access level for each of the plurality of users based on the social network data including the identified and counted emails, wherein the access level is selected from the group consisting of a read/write access, a write-only access, an execute access, a create access, an owner access, a no access, an all access, and a control access, and
       configure a access control list to provide each of the plurality of users the access level determined for accessing the shared resource.

12. The communications system according to claim 11, wherein the social network data includes one or more of identities of each of the plurality of users and the user having the shared resource, a frequency of interaction between all users for a time period, a chronology of the communications, a topic of the communications, and resources attached to the communications.

13. The communications system according to claim 11, wherein the access control list includes a user identification and the access level for the user.

14. The communications system according to claim 11, wherein the shared resource comprises one or more of a file, a directory, a user, an input/output device, a peripheral device, a portable electronic device, and a computer system.

15. The communications system according to claim 11, wherein the social network data includes monitoring communications for particular keyword(s), wherein the access level is granted based on the number of occurrences of the particular keyword(s).

16. The communications system according to claim 15, wherein different weights are assigned to different keywords, wherein certain keywords have higher weights than other keywords.

17. The communications system according to claim 11, wherein the access controller is further to
    continuously update the access control list to add and remove entries or to change access levels as users transition in and out of a social network or as communications between the users change.

18. A computer-readable storage medium having instructions which, when executed, cause a machine to:
    monitor communications between a plurality of users and a user having a shared resource coupled to a computer system of the user, the shared resource to be shared amongst one or more of the plurality of users;
    determine social network data from the communications between each of the plurality of users and the user having the shared resource, wherein each of the plurality of users has an ongoing relationship with the user having the shared resource and the social network data is based on varying degrees of interactions between each of the plurality of users and the user having the shared resource, wherein the communication includes communicating via emails between each of the plurality of users having the shared resources, wherein the emails are identified and counted;
    determine an access level for each of the plurality of users based on the social network data including the identified and counted emails, wherein the access level is selected from a group consisting of a read-only access, a read/write access, an execute access, a create access, an owner access, a no access, an all access, and a control access; and
    configure an access control list to provide each of the plurality of users the access level determined for accessing the shared resource.

19. The computer-readable storage medium according to claim 18, wherein the social network data includes one or more of identities of the plurality of users and the user having the shared resource, a frequency of interaction between all users for a time period, a chronology of the communications, a topic of the communications, and resources attached to the communications.

20. The computer-readable storage medium according to claim 18, wherein the access control list includes a user identification and the access level for the user.

21. The computer-readable storage medium according to claim 18, wherein the shared resource comprises one or more of a file, a directory, a user, an input/output device, a peripheral device, portable electronic devices, and a computer system.

22. The computer-readable storage medium according to claim 18, wherein the social network data includes monitoring communications for particular keyword(s), wherein the access level is granted based on the number of occurrences of the particular keyword(s).

23. The computer-readable storage medium according to claim 22, wherein different weights are assigned to different keywords, wherein certain keywords have higher weights than other keywords.

24. The computer-readable storage medium according to claim 18, wherein the instructions when executed, further cause the machine to continuously update the access control list to add and remove entries or to change access levels as the users transition in and out of the social network or as communications between the users changes.

25. The computer-readable storage medium according to claim 18, wherein the communications comprise one or more of emails, instant messages, file transfers, commands sent from one computer system to another, and any other types of communications performed between the plurality of users and the user having the shared resource.

26. The computer-readable storage medium according to claim 18, wherein determining social network data comprises:

identifying communications from the user having the shared resource to each of the plurality of users;

identifying communications from each of the plurality of users to the user having the shared resource; and tallying each identified communication for each of the plurality of users.

27. The computer-readable storage medium according to claim 18, wherein determining an access level comprises:

obtaining a total number of communications with the user having the shared resource for each of the plurality of users based on the social network data;

comparing the total number of communications for each of the plurality of users to an access level table to obtain the access level, the access level table comprising a plurality of access levels based on the total number of communications; and assigning an access level to each of the plurality of users.

* * * * *